US009137348B2

(12) United States Patent
Ponsford

(10) Patent No.: US 9,137,348 B2
(45) Date of Patent: Sep. 15, 2015

(54) VIEWING APPARATUS

(75) Inventor: David Ponsford, London (GB)

(73) Assignee: Skype, Dublin (IE)

( * ) Notice: Subject to any disclaimer, the term of this patent is extended or adjusted under 35 U.S.C. 154(b) by 889 days.

(21) Appl. No.: 12/778,297

(22) Filed: May 12, 2010

(65) Prior Publication Data

US 2011/0261143 A1    Oct. 27, 2011

(30) Foreign Application Priority Data

Apr. 23, 2010  (GB) .................................. 1006796.5

(51) Int. Cl.
| | |
|---|---|
| H04N 7/14 | (2006.01) |
| H04M 1/725 | (2006.01) |
| G06F 1/16 | (2006.01) |
| G06F 1/32 | (2006.01) |
| H04M 1/253 | (2006.01) |

(52) U.S. Cl.
CPC ......... *H04M 1/72522* (2013.01); *G06F 1/1694* (2013.01); *G06F 1/325* (2013.01); *G06F 1/3215* (2013.01); *H04N 7/142* (2013.01); *H04N 7/147* (2013.01); *H04M 1/2535* (2013.01); *H04M 2250/12* (2013.01); *H04M 2250/52* (2013.01)

(58) Field of Classification Search
USPC ............... 379/88.13, 93.25, 207.12; 455/350, 455/575.1, 420, 421, 422.1, 448, 456.1, 455/574; 348/14.01–14.16
See application file for complete search history.

(56) References Cited

U.S. PATENT DOCUMENTS

| | | | |
|---|---|---|---|
| 2003/0040346 A1* | 2/2003 | Fukuda et al. ................. | 455/575 |
| 2004/0204194 A1* | 10/2004 | Akai et al. .................. | 455/575.1 |
| 2009/0005087 A1* | 1/2009 | Lunati et al. .................. | 455/466 |
| 2009/0197615 A1* | 8/2009 | Kim et al. .................. | 455/456.1 |
| 2010/0053169 A1* | 3/2010 | Cook .......................... | 345/440.1 |
| 2010/0111350 A1* | 5/2010 | Eaton et al. .................. | 381/386 |

FOREIGN PATENT DOCUMENTS

| | | |
|---|---|---|
| EP | 1 170 948 A2 | 1/2002 |
| EP | 1 494 440 A2 | 1/2005 |
| EP | 1 650 938 A1 | 4/2006 |

OTHER PUBLICATIONS

Notification of Transmittal of the International Search Report and the Written Opinion of the International Searching Authority, or the Declaration for Int'l Application No. PCT/EP2011/056451; Date of Mailing: Jul. 22, 2011, 11 pp.
"Foreign Office Action", EP Application No. 1716887.2, Nov. 26, 2014, 4 pages.
"Foreign Office Action", CN Application No. 201180020524.1, Sep. 3, 2014, 14 pages.

* cited by examiner

*Primary Examiner* — Akelaw Teshale
(74) *Attorney, Agent, or Firm* — Jim Ross; Micky Minhas

(57) ABSTRACT

A mobile device and corresponding method and program. The mobile device comprises: a transceiver for accessing a packet-based network; a screen; communication processing apparatus coupled to the transceiver and screen, for conducting a packet-based video call with a remote device via a channel established over the packet-based network; and a sensor for sensing a spatial state of the mobile device. The communication processing apparatus is coupled to the sensor and configured so as to detect, during the video call, whether the mobile device is in a first spatial state or a second spatial state, and to suppress a video function of the call when in the second spatial state but not in the first spatial state.

19 Claims, 3 Drawing Sheets

Front-facing side      Rear-facing side

VIEWING APPARATUS

RELATED APPLICATION

This application claims priority under 35 U.S.C. §119 or 365 to Great Britain, Application No. 1006796.5, filed Apr. 23, 2010. The entire teachings of the above application are incorporated herein by reference.

TECHNICAL FIELD

The present invention relates to an apparatus for viewing video calls on a mobile device.

BACKGROUND

Some communication systems allow the user of a device, such as a personal computer, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

One type of communication system for packet-based communication uses a peer-to-peer ("P2P") topology. To enable access to a peer-to-peer system, a user executes P2P client software supplied by a P2P software provider on their device, and registers with the P2P system. When the user registers with the P2P system, the client software is provided with a digital certificate from a server. This may be referred to as a "user identity certificate" (UIC). Once the client software has been provided with the certificate, then calls or other communication connections can subsequently be set up and routed between end-users ("peers") of the P2P system without the further use of a server in the call set-up. Instead, the client looks up the required IP addresses from information distributed amongst the P2P client software on other end-users' devices within the P2P system. That is, the address look-up list is distributed amongst the peers themselves. Once the IP address of a callee's terminal has thus been determined, the caller's P2P client software then exchanges UIC certificates with the callee's P2P client software. The exchange of these digital certificates between users provides proof of the users' identities and that they are suitably authorised and authenticated in the P2P system. Therefore the presentation of digital certificates provides trust in the identity of the users.

It is therefore a characteristic of peer-to-peer communication that, once registered, the users can set up their own communication routes through the P2P system in at least a partially decentralized manner based on distributed address look-up and/or the exchange of one or more digital certificates, without using a server for those purposes. Further details of an example P2P system are disclosed in WO 2005/008524 and WO 2005/009019.

VoIP or other packet-based communications can also be implemented using non-P2P systems that do use centralized call set-up and/or authorisation, e.g. via server.

With increasing mobile bandwidths, there is increasing interest in providing packet-based video calls via client applications running on mobile devices such as Internet-enabled mobile phones. These mobile devices comprise transceivers such as short-range RF transceivers operating on one or more unlicensed bands for accessing the Internet via wireless access points (e.g. of wi-fi access points of WLAN networks), and/or cellular transceivers operating on one or more licensed bands for accessing the Internet via a packet-based service of a cellular network such as GPRS (General Packet Radio Service) or HSPA (High Speed Packet Access).

However, there is a problem in that even if the mobile phone has sufficient processing and bandwidth resources to support packet-based video calling, using these resources for too long will be wasteful of battery life and/or may be expensive if the connection is charged per unit data. Packet-based video calling is therefore still restricted by the available resources when accessed through a mobile device. Furthermore, from a network operator's perspective it may still be desirable to try to avoid excessive network traffic.

SUMMARY

According to one aspect of the present invention, there is provided a mobile device comprising: a transceiver for accessing a packet-based network; a screen; communication processing apparatus coupled to the transceiver and screen, for conducting a packet-based video call with a remote device via a channel established over the packet-based network; and a sensor for sensing a spatial state of the mobile device; wherein the communication processing apparatus is coupled to said sensor and configured so as to detect, during the video call, whether said mobile device is in a first spatial state or a second spatial state, and to suppress a video function of the call when in the second spatial state but not in the first spatial state.

Thus according to the present invention, the processing apparatus is configured to suppress certain video functionality when the device is in a particular spatial orientation or position, e.g. by suspending transmission or processing of video signals when held to a user's ear. This advantageously avoids incurring unnecessary battery power, processing resources and/or network resources when the mobile device is in a spatial orientation or position in which the suppressed video would have no benefit to the user anyway. E.g. a user cannot view video while their device is held to his or her ear, and furthermore the transmitted video would be of no interest to the remote user when the transmitting device is held to the user's ear.

In embodiments, the video call may comprise at least one of an incoming and outgoing video signal and at least one of an incoming and outgoing audio signal, and the communication processing apparatus may be configured so as to suppress use of at least one of the video signals when said mobile device is in the second spatial state but not the first spatial state, and to use the audio signals when in the first state.

The video call may comprise an outgoing video signal transmitted to the remote device, and the communication processing apparatus may be configured to suspend transmission of the outgoing video to the remote device when said mobile device is in the second spatial state but not the first spatial state.

The video call may comprise an incoming video signal received from the remote device, and the communication processing apparatus may be configured to suspend output of the incoming video signal to the screen when said mobile device is in the second spatial state but not the first spatial state.

The video call may comprise an incoming video signal received from the remote device, and the communication processing apparatus may be configured to perform a decoding operation on the incoming video signal for output to the screen, and to suspend said decoding operation when said mobile device is in the second spatial state but not the first spatial state.

The video call may comprise an outgoing video signal transmitted to the remote device; and the communication processing apparatus may configured to perform an encoding operation on data captured from a camera to generate the outgoing video signal for transmission, and to suspend said encoding operation when said mobile device is in the second spatial state but not the first spatial state.

The video call may comprise an incoming video signal received from the remote device, and the communication processing apparatus may be configured to send a message controlling the remote device to suspend transmission of the incoming video signal when said mobile device is in the second spatial state but not the first spatial state.

The second spatial state may comprise said mobile device being held to a user's ear.

The mobile device may comprise a rear-facing camera arranged to generate data for said outgoing video signal, and the first spatial state may comprise said mobile device being held in a video capture position.

The screen of said mobile device may be used to display locally captured video from said rear-facing camera when held in the video capture position.

The mobile device may comprise a front-facing camera arranged to generate data for said outgoing video signal, and the first spatial may state comprise said mobile device being held in a video capture position.

The sensor may comprise a proximity sensor. The sensor may comprise an accelerometer.

The communication processing apparatus may be configured to send a message notifying a user of the remote device when said function of the video call is suppressed.

The communication processing apparatus may comprise a user-setting, arranged such that enabling the video function in said first spatial state is dependent on the user-setting.

Said packet-based network may comprise the Internet, and said processing apparatus may be arranged such that said video call comprises an IP-based video call.

According to another aspect of the present invention, there is provided a method of operating a mobile device comprising a transceiver, a screen, and communication processing apparatus, the method comprising: using the processing apparatus and transceiver to establish a packet-based video call with a remote device via a channel established over a packet-based network; using a sensor to sense a spatial state of the mobile device; and based on the sensor, using the communication processing apparatus to detect, during the video call, whether said mobile device is in a first spatial state or a second spatial state, and to suppress a video function of the call when in the second spatial state but not in the first spatial state.

In embodiments, the method may further comprise steps in accordance with any of the above device features.

According to another aspect of the present invention, there is provided a program product for operating a mobile device comprising a transceiver, a screen, and communication processing apparatus, the program product comprising code embodied on a computer-readable medium and configured so as when executed on the processing apparatus to: establish a packet-based video call with a remote device via a channel established over a packet-based network; use a sensor to sense a spatial state of the mobile device; detect based on the sensor, during the video call, whether said mobile device is in a first spatial state or a second spatial state; and suppress a video function of the call when in the second spatial state but not in the first spatial state.

In embodiments, the code may be further configured in accordance with any of the above device features.

BRIEF DESCRIPTION OF THE DRAWINGS

For a better understanding of the present invention and to show how it may be put into effect, reference is now made by way of example to the accompanying drawings in which.

DETAILED DESCRIPTION

The present invention controls a video call in dependence on a spatial position or orientation of the mobile phone or other such device, e.g. in dependence on whether the phone is held to the user's ear, or whether the phone is held in a video capture or display position.

According to one embodiment of the invention, a video call is controlled by only transmitting video from the device when the phone is held away from the user's ear. Video is paused when the user returns the phone to his ear and restarted when the phone is again held in the video capturing position. This allows the user to easily control the video content transmitted from the device. This also conserves battery life and bandwidth usage. The user is able to view the screen while either recording a video of himself, or recording what he is viewing, depending on the location of the camera.

According to a further embodiment of the invention, a video call is controlled by only outputting received video when the phone is held away from the user's ear. In this manner video is only output from the device when the user is able to view the video. Video may be paused when the user returns the phone to his ear and restarted when the phone is again held in the video capturing position. Alternatively the far end terminal may be instructed to stop transmitting video and to resume sending video, depending on the positioning of the phone. This again conserves battery life and additionally may reduce bandwidth usage.

The two embodiments may be used together, or alternatively only one of the embodiments may be implemented in any given device.

Preferably, when the output of received video signals to the screen is suspended due to the orientation or position of the phone, then at least one or more decoding operations performed on any received video signals may also be suspended. Similarly, when the transmission of video signals to a remote user is suspended due to the position or orientation, then at least one or more encoding operations performed on the video data from the local camera may be suspended.

The positioning of the mobile phone may be determined using any suitable sensor for sensing a spatial status of the phone, e.g. proximity sensors or an accelerometer in the device.

In a preferred embodiment of the invention the user must select the relevant feature in order to be able to transmit video. That is, the feature of enabling video upon detecting a certain position or orientation of the mobile device must be explicitly selected by the user. This avoids unintentional activation of the camera when the user moves the phone away from their ear.

The ability to start video session may be sent using an IM chat message to the potential recipient.

Figure 1:
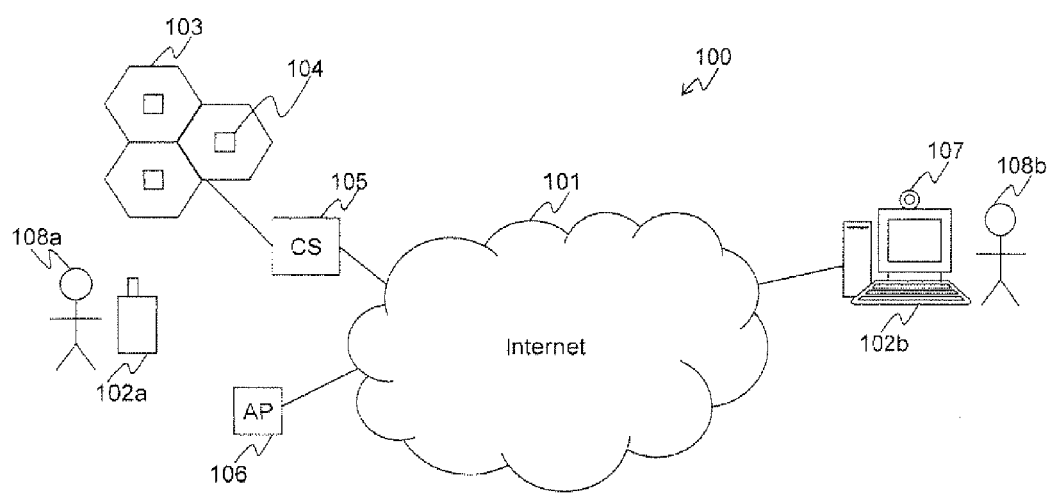
FIG. 1 is a schematic representation of a communication system.

FIG. 1 is a schematic illustration of a communication system 100 comprising a packet-based network 101 such as the Internet, and a mobile cellular network 103. The mobile cellular network 103 comprises a plurality of base stations 104 (sometimes referred to as node Bs in 3GPP terminology). Each base station 104 is arranged to serve a corresponding cell of the cellular network 103. Further, the packet-switched network 101 comprises a plurality of wireless access points 106 such as wi-fi access points for accessing the Internet. These may be the access points of one or more wireless local area networks (WLANs).

A plurality of user terminals 102 are arranged to communicate over the networks 101 and/or 103. At least one of the user terminals 102 comprises a mobile device such as an Internet-enabled mobile phone, and others of the user terminals 102 may comprise for example desktop or laptop PCs.

Figure 2:
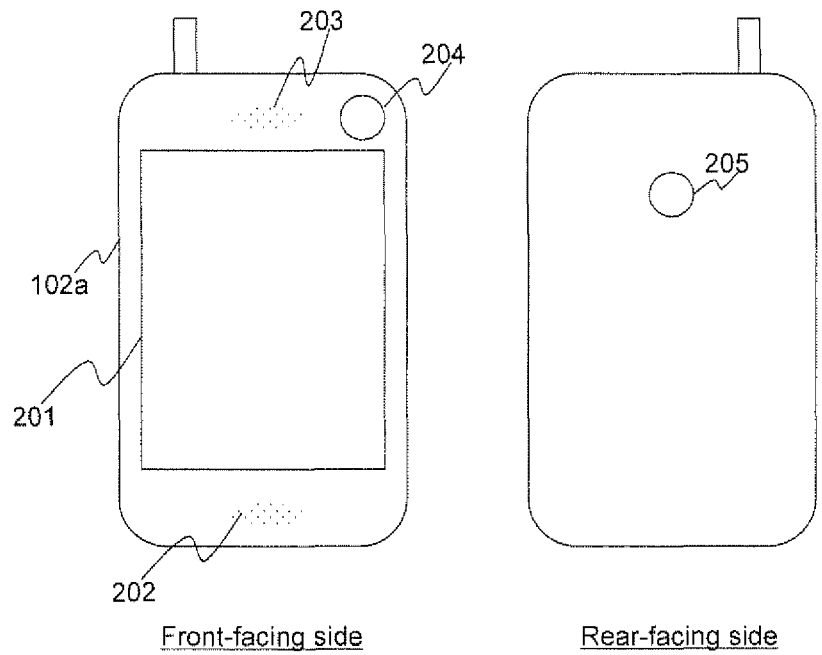
FIG. 2 is a schematic representation of a mobile terminal.
Figure 3:
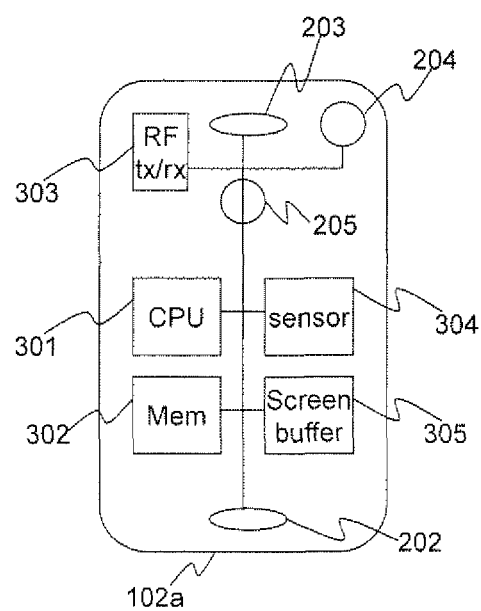
FIG. 3 is a schematic block diagram of a mobile terminal.

An example mobile device 102a is shown schematically in FIGS. 2 and 3. The mobile device 102a comprises a processing apparatus in the form of one or more processor units (CPUs) 301 coupled to a memory 302 storing a communication client application. The processor 301 is also coupled to: an RF transceiver 303 for accessing the Internet 101, a microphone 202, a speaker 203, a screen buffer 305 for outputting video signals to the screen 201 of the device 102a, and at least one of a front-facing camera 204 facing in the same direction as the screen 201 and a rear-facing camera 205 facing on the opposite direction to the screen 201. The mobile device 102a also comprises one or more physical sensors coupled to the processor 301, for sensing a spatial orientation or position of the device 102a, as will be discussed shortly.

Each user terminal 102 comprises one or more transceivers 303 for accessing the one or more networks 101 and/or 103. For example, each user terminal 102 may comprise a cellular wireless transceiver for accessing the mobile cellular network 103 via the base stations 104, and/or a wired or wireless modem for accessing the Internet 101. In the case of a wireless modem, this typically comprises a short-range wireless transceiver (e.g. wi-fi) for accessing the Internet 101 via the wireless access points 106.

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology, or Radio Network Controllers (RNCs) in USTM or HSPA terminology.

Each user terminal 102 further comprises a non-volatile memory 302 such as an electronic erasable and programmable memory (EEPROM, or "flash" memory) coupled to the processor 301. The memory 302 stores communications code arranged to be executed on the processor 301, and configured so as when executed to engage in communications over the Internet 101 and/or cellular network 103. The communications code preferably comprises a communication client application for performing communications such as voice or video calls with other user terminals 102 over the Internet 101, via a short-range wireless transceiver 303 and wireless access points 106, and/or via a cellular wireless transceiver 303, base stations 104 and controller stations 105 of the cellular network 103 as discussed above. However, one or more of the user terminals 102 involved could alternatively communicate via a wired modem, e.g. in the case of a call between a mobile terminal and a desktop PC.

In this manner, a mobile device 102a is arranged to establish a call with another, remote terminal 102b via the Internet 101 (or other packet-based network). In the example shown the remote terminal 102b is a desktop computer, but in other embodiments could be another mobile device.

Particularly, if the video calling feature is enabled by the user, the call comprises a live video call between the mobile device 102a and 102b. The video call comprises an exchange of signals captured in real-time by the devices 102a and 102b, transmitted in the form of IP packets via the Internet 101. The exchanged signals may comprise an incoming video signal from the remote terminal 102b for decoding by the client application on the mobile device 102a and output to the screen 201. The exchanged signals may comprise an outgoing video signal captured by one of the cameras 204 or 205 of the mobile terminal 102 and encoded by the client on the mobile device 102a for transmission to the remote device 102b. The exchanged signals may comprise both incoming and outgoing video signals, although alternatively the video call need not be bidirectional and could comprise video transmitted in only one direction from only one of the user devices 102. The exchanged signals preferably also comprise an incoming audio signal from the remote device 102b for output via the speaker 203 on the mobile device 102a, and/or an outgoing audio signal captured by the microphone 202 on the mobile device 102a for transmission to the remote device 102b. In the case of a phone call, the audio signals are typically speech signals encoded and decoded according to a suitable speech codec.

As discussed above, in preferred embodiments of the present invention the client application running on the processor 301 of the mobile device 102a is configured to detect, based on an input from the one or more sensors 304, whether the device 102a is in one of at least two spatial states: (i) a first spatial orientation or position, or (ii) a second spatial orientation or position.

In one preferred embodiment, the sensor 304 may comprise a proximity sensor arranged to detect the proximity of physical matter without requiring physical contact to be made (e.g. by emitting an electromagnetic field or radiation and detecting a change in a return signal). Particularly, the proximity sensor may be arranged to detect when the mobile device 102a is near the user's face, indicating it is being held to the ear.

In another preferred embodiment, the sensor 304 may comprise an accelerometer. Most preferably in this embodiment, the accelerometer comprises a three-axis accelerometer, particularly one sensitive enough to measure acceleration on a scale smaller than 1 g and therefore able to detect the direction of gravity. In such embodiments, the client running on the processor 301 may process the input data from the accelerometer in order to detect when the user has the mobile device held to his or her ear, and when the user has the mobile device in a different position or orientation such as holding the phone in a rear-facing video capture mode. For example the detection may be based on the angle of the device 102a relative to the ground, and/or based on detecting motion between two positions (e.g. given knowledge of the initial position).

In other embodiments, the sensor 304 may comprise other types of sensor for detecting a spatial position or orientation of the phone, e.g. a digital compass and/or mercury tilt switch.

In order to achieve the most accurate detection of position or orientation, and avoid false detections, the input from any or all of such sensors 304 may be processed in conjunction with one another by the processor 301.

Figure 4:
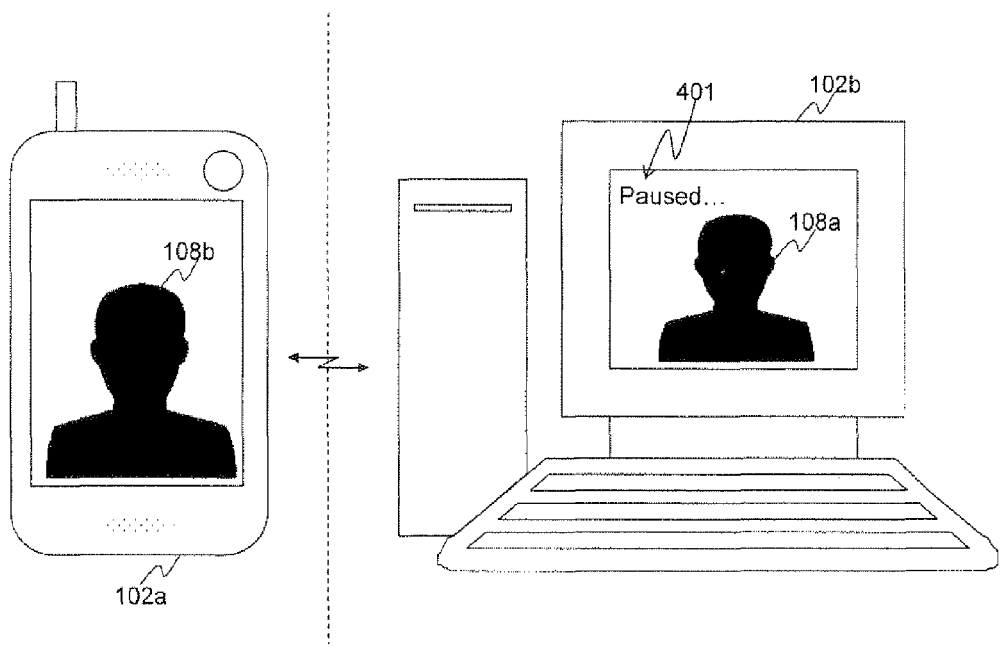
FIG. 4 is a schematic representation of a video call between two devices.

FIG. 4 shows one exemplary use of the present invention. Here the local user 108a of the mobile device 102a and the remote user 108b of the remote device 102b are conducting a face-to-face video call using the front-facing camera 204. When the local user 108a holds the mobile device 102a up in a video capture position (i.e. with the screen 201 and front facing-camera 204 facing towards the local user 108a), then both the incoming and outgoing video functionality of the mobile device 102a is enabled. That is, the encoding and transmission of video from the front-facing camera 204 of the mobile device 102a is enabled, and the decoding and output of received video from the remote device 102b to the screen 201 of the mobile device 102a is also enabled. However, when the local user 108a holds the mobile device 102a to his or her ear, then both the incoming and outgoing video functionality of the mobile device 102a is disabled. That is, the encoding and transmission of video from the front-facing camera 204 of the mobile device 102a to the remote device 102b is disabled, and the decoding and output of received video from the remote device 102b to the screen 201 of the mobile device 102a is also disabled. In a particularly preferred embodiment, the client on the mobile terminal 102 also sends a control message via the Internet 101 to the remote device 102b, controlling it to suspend transmission of video from the remote terminal 102b to the mobile terminal 102a. When moved back away from the local user's ear, the video functionality of the local device 102a may be resumed, and a further control message may be transmitted to the remote device 102b instructing it to resume transmission of video These features are advantageous because they avoid incurring unnecessary processing and network bandwidth when the mobile device 102a is in such a position that no benefit would be derived by either user from processing or transmitting video—i.e. the local user 108a cannot view the received video when the phone is at his or her ear, and the remote user 108b is likely to have no interest in viewing video of the local user's ear.

In a further embodiment, the client on the mobile device 102a sends a notification message to the remote device 102b over the Internet 101, notifying it that video transmission has been paused. In response, the remote device 102b may output an on-screen message 401 to the remote user 108b informing him or her of the fact.

Figure 5:
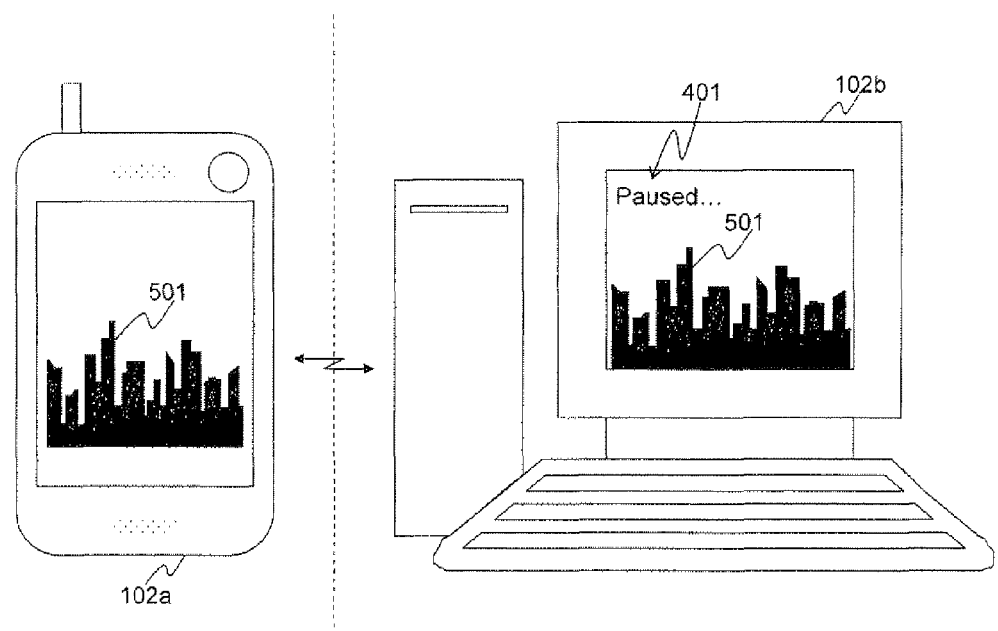
FIG. 5 is another schematic representation of a video call between devices.

FIG. 5 shows another exemplary use of the present invention. Here, the local user 108a of the mobile device 102a is using the rear-facing camera 205 to share a video stream of a local scene 501 to the remote user 108b of the remote device 102b. When the mobile device 102a is held in the video capture position, only outgoing video functionality is enabled and incoming video functionality is suppressed. That is, the encoding and transmission of video from the rear-facing camera 205 of the mobile device 102a to the remote device 102b is enabled, but the decoding and output of received video from the remote device 102b to the screen 201 of the mobile device 102a is disabled. If the mobile device 102a is moved to the local user's ear, both the incoming and outgoing video functionality will then be disabled. That is, the encoding and transmission of video from the rear-facing camera 205 of the mobile device 102a to the remote device 102b is also disabled. Control messages may also be transmitted to the remote device 102b in the example of FIG. 5 in order to enable and disable transmission of video from the remote device 102b accordingly.

Again, these features are advantageous because they avoid incurring unnecessary processing and network bandwidth when the mobile device 102a is in such a position that no benefit would be derived by either user—i.e. when the local user 108a is holding the mobile device 102a in the rear-facing capture position then he or she may wish to view the locally captured video 501 instead of the incoming video received from the remote terminal 102b (the local user 108a views the same video 501 as transmitted to the remote user 108b).

Also, if the mobile device 102a is held to the ear, then the client may send a notification message to the remote device 102b notifying it that video transmission has been paused; and in response, the remote device 102b may output an on-screen message 401 to the remote user 108b informing him or her of the fact.

Note that in either of the above examples, the channel used to conduct the call over the Internet 101 (or other packet-based network) is kept open, such that the video functionality is enabled and suppressed within the same session. Further, audio functionality may be maintained over the channel regardless of whether the video is being transmitted, received and/or processed, such that the users 108a and 108b can continue to speak when the mobile device 102a is in the video capture position, not just when at the local user's ear.

As mentioned, in a preferred embodiment of the invention the user must set a user-setting in order to activate the feature of orientation or position dependent video calls—this avoids unintentional activation of the camera when the user moves the phone away from their ear.

An IM chat message may be sent to notify the potential remote recipient 108b that the local user 108a has the above capability on his or her device 102a. Alternatively such notification could be advertised in the local user's profile which is viewable via the remote user's client application.

It will be appreciated that the above embodiments have been described only by way of example.

For instance, other orientations could be used to control the video functionality of the call. E.g. If the phone is laying substantially flat or on its side (relative to the ground), or at a certain angle, it may be assumed that the user has temporarily ceased participating in the call and so the transmission of video and processing of received video may be paused.

Note also that whilst the invention may be described in terms of "suppressing" some video function in a second orientation or opposition but not in a first, it will be appreciated that this could equally be described in terms of "enabling" the video function in the first orientation/position but not the second. These are considered equivalent from the perspective of the present invention. Hence the invention may apply to the case of a mainly video call with occasional suppression of the video as the user lifts the phone to his or her ear, or the other way round, to the case of a mainly voice call with occasional enabling of the video when the user holds the phone up in the capture position.

Further, whilst the above has been described largely in terms of a video capture position, this could be equivalent to a video display position or viewing position in which the user can either view the video that is being captured or received from the remote source (or both).

Further, the term "application" as used herein is not limiting to any one discrete or indivisibly executable software unit, but more generally can refer to any one or more portions of code which operate together to provide the relevant functionality. E.g. the communication client application could comprise a basic client application and separate plug-in application, and/or some of the described functionality of the client application could be incorporated into a portion of code that may be referred as being part of another application or program.

Other uses or variants of the present invention may become apparent to a person skilled in the art given the disclosure herein. The invention is not limited by the described embodiments, but only be the accompanying claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

What is claimed is:

1. A mobile device comprising:
a transceiver for accessing a packet-based network;
a screen;
a sensor for sensing a spatial state of the mobile device;
a communication processing apparatus, coupled to the transceiver, the screen, and the sensor, the communication processing apparatus configured to conduct a packet-based video call with a remote device via a channel established over the packet-based network, the communication processing apparatus configured to detect, during the video call, whether said mobile device is in a first spatial state or a second spatial state, and responsive to detecting that the mobile device is in the second spatial state:
automatically disable encoding and transmission of an outgoing video signal of the call from the mobile device to the remote device; and
automatically transmit a control message to the remote device, the control message causing the remote device to automatically suspend transmission of an incoming video signal for the call from the remote device to the mobile device.

2. The mobile device of claim 1, wherein the video call comprises the incoming video signal and the outgoing video signal and an incoming audio signal and an outgoing audio signal, and the communication processing apparatus is further configured to suppress use of at least one of the video signals when said mobile device is in the second spatial state but not the first spatial state, and to use the audio signals when in the first state.

3. The mobile device of claim 1, wherein the communication processing apparatus is further configured to suspend output of the incoming video signal to the screen when said mobile device is in the second spatial state but not the first spatial state.

4. The mobile device of claim 1, wherein the second spatial state comprises said mobile device being held to a user's ear.

5. The mobile device of claim 1, wherein the mobile device comprises a rear-facing camera arranged to generate data for said outgoing video signal, and the first spatial state comprises said mobile device being held in a video capture position.

6. The mobile device of claim 5, wherein the screen of said mobile device is operable to display locally captured video from said rear-facing camera when held in the video capture position.

7. The mobile device of claim 1, wherein the mobile device comprises a front-facing camera arranged to generate data for said outgoing video signal, and the first spatial state comprises said mobile device being held in a video capture position.

8. The mobile device of claim 1, wherein the sensor comprises a proximity sensor.

9. The mobile device of claim 1, wherein the sensor comprises an accelerometer.

10. The mobile device of claim 1, wherein the communication processing apparatus is configured to send a message notifying a user of the remote device when the encoding and transmission of the outgoing video signal is disabled.

11. The mobile device of claim 1, wherein the communication processing apparatus comprises a user-setting, and wherein the communication processing apparatus is configured to automatically disable encoding and transmission of the outgoing video signal based on the user-setting.

12. The mobile device of claim 1, wherein said packet-based network is the Internet, and said processing apparatus is arranged such that said video call is an IP-based video call.

13. A method comprising:
establishing, at a mobile device, a packet-based video call with a remote device via a channel established over a packet-based network;
detecting, during the video call, whether said mobile device is in a first spatial state or a second spatial state; and
responsive to detecting that the mobile device is in the second spatial state:
automatically disable encoding and transmission of an outgoing video signal of the call from the mobile device to the remote device; and
automatically transmit a control message to the remote device, the control message causing the remote device to automatically suspend transmission of an incoming video signal for the call from the remote device to the mobile device.

14. A computer-readable storage device comprising code stored thereon that, responsive to execution by a processing apparatus of a mobile device, performs operations comprising:
establishing a packet-based video call with a remote device via a channel established over a packet-based network;
detecting, during the video call, whether said mobile device is in a first spatial state or a second spatial state; and
responsive to detecting that the mobile device is in the second spatial state:
automatically disable encoding and transmission of an outgoing video signal of the call from the mobile device to the remote device; and
automatically transmit a control message to the remote device, the control message causing the remote device to automatically suspend transmission of an incoming video signal for the call from the remote device to the mobile device.

15. The computer-readable storage device of claim 14, wherein the video call comprises the incoming video signal and the outgoing video signal and an incoming audio signal and an outgoing audio signal, and wherein the operations further comprise suppressing use of at least one of the video signals when said mobile device is in the second spatial state but not the first spatial state, and using the audio signals when in the first state.

16. The computer-readable storage device of claim 14, wherein the operations further comprise suspending output of the incoming video signal to the screen when said mobile device is in the second spatial state but not the first spatial state.

17. The computer-readable storage device of claim 14, wherein the second spatial state is detected when the mobile device is held to a user's ear.

18. The computer-readable storage device of claim 14, wherein the mobile device comprises at least one of a rear-facing camera and a front-facing camera arranged to generate data for said outgoing video signal, and wherein the first spatial state is detected when the mobile device is held in a video capture position.

19. The computer-readable storage device of claim 18, wherein operations further comprise displaying locally captured video from said rear-facing camera on said screen when held in the video capture position.

\* \* \* \* \*